United States Patent [19]

Taub

[11] 3,984,364

[45] Oct. 5, 1976

[54] AQUEOUS AEROSOL AIR DRYING PAINTS

[75] Inventor: Bernard Taub, Buffalo, N.Y.

[73] Assignee: Allied Chemical Corporation, Morris Township, N.J.

[22] Filed: July 24, 1974

[21] Appl. No.: 491,577

[52] U.S. Cl. .............................. 260/22 R; 222/192; 260/29.2 E; 260/33.6 R; 260/33.8 R
[51] Int. Cl.² ............................................ C09D 3/64
[58] Field of Search ........ 260/22 A, 33.8 R, 29.2 E, 260/33.6 R, 22 R; 222/192

[56] References Cited
UNITED STATES PATENTS

| | | | |
|---|---|---|---|
| 2,995,278 | 8/1961 | Clapp | 222/192 |
| 3,096,001 | 7/1963 | Boe et al. | 260/22 A |
| 3,137,416 | 6/1964 | Shepherd et al. | 222/192 |
| 3,343,718 | 9/1967 | Siegel et al. | 222/192 |
| 3,383,344 | 5/1968 | Gill | 260/22 A |
| 3,547,846 | 12/1970 | Coulter | 260/22 A |
| 3,776,873 | 12/1973 | Kremer | 260/33.8 R |
| 3,938,708 | 2/1976 | Burger | 222/192 |

FOREIGN PATENTS OR APPLICATIONS

| | | | |
|---|---|---|---|
| 1,040,828 | 9/1966 | United Kingdom | 260/22 A |

OTHER PUBLICATIONS

Patton, Alkyd Resin Technology Formulating Techniques and Allied Calculations, Interscience Publishers, N.Y., N.Y., 1962, p. 175.

Martens, Technology of Paints, Varnishes and Lacquers, Krieger Publishing Company, Huntington, N.Y., 1968, pp. 610 and 611.

Sanders, Principles of Aerosol Technology, Van Nostrand Reinhold Company, N.Y., N.Y., 1970, pp. 228 and 240–244.

*Primary Examiner*—Ronald W. Griffin
*Attorney, Agent, or Firm*—Anthony J. Stewart; Jay P. Friedenson

[57] ABSTRACT

An aerosol paint composition is provided which is composed of a dispersion of an alkyd or polyester resin, containing a pigment, in a liquid medium. The liquid medium has two components the first of which is a mixture of 30 to 50 percent of an aromatic hydrocarbon and 50 to 70 percent of a halogenated hydrocarbon, the mixture having a boiling point between 70° – 150°C, and, the second of which is a liquified normally gaseous halogenated hydrocarbon having 1 to 4 carbon atoms and a boiling point below about 25°C.

9 Claims, No Drawings

AQUEOUS AEROSOL AIR DRYING PAINTS

BACKGROUND OF THE INVENTION

Water soluble or water dispersible air drying enamels are finding wider application as industrial finishes. The main reason for this increase in the use of water as a solvent which is readily available, inexpensive, non-toxic and non-flammable. To offset these attractions, some difficulties exist by virtue of the chemical nature of this solvent, namely: high freezing point, low evaporation rate, high surface tension and tendency to corrode steel structures. Nevertheless, many of these difficulties have been overcome and more and more water based, air drying enamels are being used. For example, maleinized oils, or water based alkyds, are used commercially for dip application of films to various industrial items. In the automotive industry there is considerable interest and application of water based dipping primers. Another rapidly extending method of application of water based materials is by electrodeposition. With this technique paint can be applied evenly to various parts of an unevenly shaped substrate.

Also water soluble or water thinnable air drying enamels find wide use today in view of the fact that they produce a finish which dries and/or cures after a short period of application. They are also highly desirable since clean-up can be done with water. In those instances where the painted surface becomes scratched, marred or dirty, it is only necessary to touch up the painted surface with the original paint. However, in some cases this becomes impractical because of the necessity to save some of the original paint or it becomes inconvenient and time-consuming to prepare and clean up the equipment such as brushes or rollers.

Heretofore this type of touch-up painting, or coating operation was accomplished with the use of aerosol containers. In fact, paints and varnishes have become established aerosol products. Such products afford several distinct advantages in applying coating compositions especially when used on small objects with numerous or awkwardly situated surfaces such as toys, bicycles, machinery, etc. Although the aerosol package may seem comparatively expensive when compared with the conventional can of paint, it will be appreciated that the consumer does not have the trouble of cleaning up. Additionally, there is no necessity for the preparation and maintenance of equipment such as brushes, etc. Because of the exclusion of air from the aerosol package, aerosol paints have an almost unlimited shelf life.

Although, prior to this time, color matched aerosol paints have been available, all such paints have been of the oil base type which are formulated in solvent systems. As far as it is known, none of the oil based aerosol enamel paints have been formulated without solvents which are flammable and/or noxious.

It is an object of the present invention to provide a sprayable air drying water-based enamel aerosol paint composition. It is a further object of the present invention to provide an aerosol sprayable air drying water-based enamel paint which is easy to apply, does not foam and provides a good surface cover. It is a further object of this invention to provide an aerosol water-based enamel paint composition which is relatively safe for general use as being relatively non-flammable and non-noxious. These and other objects will become apparent from the description which follows.

BRIEF DESCRIPTION OF THE INVENTION

Briefly, in accordance with this invention, there is provided an aerosol paint composition comprising a dispersion of a pigment-containing aqueous solution of an amine salt of an alkyd or polyester resin having a molecular weight below about 10,000, in a liquid medium comprising (a) a mixture of 30 tō 50 percent by weight of an aromatic hydrocarbon and 50 to 70 percent of a halogenated hydrocarbon, said mixture having a boiling point between about 70°–150°C, and (b) a liquified normally gaseous halogenated hydrocarbon having 1 to 4 carbon atoms and a boiling point below about 25°C.

Compositions formulated in accordance with this invention may be applied as covering from an aerosol container without excessive foaming or dryness, have adequate adhesion properties and are relatively inflammable and non-noxious.

DETAILED DESCRIPTION OF THE INVENTION

Water being the original solvent, it is not surprising to find that water-based coatings have been used for hundreds of years. Water-based paints were made from water soluble natural resins, gums or proteins, or from suspensions of water insoluble materials in water.

Although it is often difficult with molecules of the size needed for paint applications, i.e., a molecular weight between 5,000 and 10,000, to distinguish between emulsions and the solutions, this invention is concerned with hydrophilic polymers containing polar groups, thus rendering them water-soluble. A distinction is drawn between polymers of this type and the basically insoluble polymers, e.g. polyvinyl acetate and polyvinyl chloride which can be emulsified in water under suitable conditions to give water based coatings. These hydrophilic, polar group-containing polymers are a comparatively recent development, as many of the raw materials involved have become available through modern advances in the chemical and petrochemical industries.

The polar groups which can be used to confer water solubility are hydroxyl (polyvinyl alcohol) and ether (polyethylene oxide). It is obvious that coatings made from polymers of this type would remain sensitive to water and would therefore be of little use unless some chemical change occurred to make the coatings insoluble in water. Other examples of polar groups are amides, methylol amides and carboxylic acids.

The earliest resins used for the preparation of water soluble coatings were the maleinized oils. It was found that unsaturated oils could be made to react with maleic anhydride to form products which were water soluble after neutralization of the acid groups. The products formed films which are hard and insoluble after 2–3 hours air drying.

Alkyd resins as normally used in the surface coating industry are oil-modified polyesters made from a fatty acid, a polyol and a dibasic acid. The polyol can be glycerol, pentaerythritol, trimethylolpropane, etc; the dibasic acid is usually phthalic acid; the fatty acid is often used in the form of a triglyceride oil which is initially converted to a monoglyceride or partial ester by reacting with a polyol. The fatty acid used is dependent on the type of coating required, e.g. air-drying or baking, and, the type of color required. A slight excess of hydroxyl is required, and the resins are normally processed to give a final acid value of 20 or less. If an acid of high basicity is used together with a dihydric alcohol, resins can be obtained with high acid values (50 or more) which, when neutralized with bases, are water soluble. Acids available for this type reaction are trimellitic anhydride, pyromellitic anhydride and cyclohexanone tetrapropionic acid.

A large number of unsaturated monomers are available which can be copolymerized to produce thermosetting acrylic resins, and many of these monomers contain groups which confer water soluble properties to the polymer, e.g. carboxylic acid groups (acrylic acid, maleic acid), methylol amide groups (methylol acrylamide), hydroxyl groups (hydroxyethyl acrylate).

For air drying enamels, amine salts of the resins are employed due to high solubility and quick drying characteristics. Thus, in some cases, it may be necessary to convert a commercial enamel paint resin to its amine salt prior to the formulation of the paint and the aerosol composition of this invention. This is easily accomplished by admixing the resin with ammonium hydroxide, triethylamine, or other like reactive amines.

A brief description of the method for selecting such resins for specific formulations appears in the Journal of Paint Technology, Vol. 45, No. 583 (1973) pages 33–40 (which is incorporated herein by reference). This article also indicates the wide variety of suitable resins employed in paint formulations. It is particularly advantageous, and indeed preferred, to employ a resin which is commercially available in common paint compositions, since, by doing so, the use of the aerosol compositions is greatly enhanced, that is, they can be used in conjunction with the commercial paint formulations.

The pigment selection will of course depend upon the desired result, namely, the color of the aerosol paint. Any of those pigments commonly used in paint compositions can be employed in the composition of the present invention. Among those pigments which may be mentioned as exemplary are titanium dioxide, carbon black, phthalocyanines, molybdates, perlenes, flavanthrones, quinacridones and other known paint pigments.

As used herein, the term "dispersion" is intended to include solutions, emulsions, and solution-emulsions, i.e., a portion of the component is solubilized and a portion is emulsified.

The liquid medium into which the pigment containing resin is dispersed in a mixture of 30 to 50 weight percent of an aromatic hydrocarbon and 50 to 70 percent of a halogenated hydrocarbon. This mixture should have a boiling point between about 70°–150°C. It has been found that if the liquid medium has a boiling point below about 70°C the paint composition dispersed from the aerosol is dry and powdery and results in an unsatisfactory finish. The 150°C upper limit for the boiling point of the liquid medium containing the resin and pigment is based on the observation that liquids which boil above this temperature produce an aerosol spray which, when applied to an article, is so thin as to cause excessive running and an unsatisfactory coating. The preferred boiling range is 80° to 100°C.

Aromatic hydrocarbons are employed in the composition of the present invention inasmuch as the use of aliphatic hydrocarbons, even those which have the proper boiling point, produce a paint finish which is dull and undesirable. Among those hydrocarbons which may be employed in the first component of the liquid medium of ths invention are xylene, toluene, benzene, etc. Particularly preferred is xylene.

The halogenated hydrocarbon forming a portion of the mixture which is the first component of the liquid medium composition of this invention is selected from the halogenated hydrocarbons known in the art. Among those halogenated hydrocarbons that may be mentioned as exemplary are 1,1,1-trichloroethane, 1,1,2-trichloroethane, perchloroethylene, methylene chloride, 1,1,2-trichloroethene, and the like.

It has been found that the use of a mixture of aromatic hydrocarbon and halogenated hydrocarbons falling within the limits described above is necessary in order to satisfactorily produce aerosol sprayable air-drying enamels of this invention. The use of either an aromatic alone or a halogenated hydrocarbon alone has not been found to produce satisfactory results for air-drying paints. While not wishing to be bound to any specific theory, it is believed that the aromatic hydrocarbon is necessary in the composition of this invention since it acts as a solvent or partial solvent for the resin thus resulting in easier and more complete sprayability as well as superior stability of the dispersion in the aerosol package. While the use of an aromatic hydrocarbon alone might be satisfactory in some respects, it is not satisfactory to the extent that such a composition would be extremely flammable. Thus, according to this invention, it has been found that the admixture of aromatic hydrocarbon with the halogenated hydrocarbon produces a mixture which allows even spraying of aerosol air-drying paints and which fall within the accepted standard limits for flammability.

A surprising aspect of the composition of the present invention is the fact that it has been found that no surfactant or surface active agent, is necessary to produce stable and non-foaming dispersions when operating in accordance with the present invention even though water based paints are used. Heretofore it has generally been considered necessary to employ surfactants in order to stabilize coating compositions and to prevent foaming especially in the aerosol state, but, it has unexpectedly been found that satisfactory compositions are produced in accordance with this invention in the absence of such surface active agents.

The second component of the liquid mixture of the aerosol paint composition of the present invention is a liquified normally gaseous halogenated hydrocarbon having 1 to 4 carbon atoms and a boiling point below about 25°C. Such compounds are well recognized in the art as fluorocarbon or halocarbon propellants. The propellants must be liquifiable under the conditions prevailing in the aerosol container and must have a vapor pressure sufficient to carry the paint from the container as the pressure is released. Among the halogenated hydrocarbons useful in the aerosol paint composition of this invention are dichlorodifluoromethane, dichlorofluoromethane, monochlorofluoromethane, tetrafluorodichloroethane, dichlorofluoroethane, difluoroethane, and other like propellant compositions.

In the preparation of the aqueous aerosol air-drying paint composition of this invention, the resin containing pigment and water is first formed in a known manner, i.e., the resin is prepared, mixed with pigment and ground and thereafter let down in a conventional manner with more resin, water and other known addition agents such as wetting agents, flow agents, driers, levelling agents, and the like. Although thickeners may be employed in the composition of the present invention, it is preferable to omit them since the likelihood of clogging of the aerosol spray is greatly redued. Separately, the first component of the liquid medium is prepared by admixing the aromatic hydrocarbon in the desired percentage with the halogenated hydrocarbon. The paint is then added to the mixture of aromatic hydrocarbon and halogenated hydrocarbon and shaken well to emulsify the system. Thereafter the propellant is added under pressure to extend the emulsion. Since the propellant is a normally gaseous halogenated hydrocarbon, it is first liqufied by known means. the component containing the pigmented resin is added to a suitable aerosol container having, for example, a valve component crimped thereon and thereafter, the propellant component is added under pressure to extend the emulsion. Again, the total mixture is shaken to form an emulsion.

DESCRIPTION OF PREFERRED EMBODIMENTS

The following examples are given by way of illustration only. Parts are given by weight unless otherwise noted.

EXAMPLE 1

A blend of 428.6 parts of Arolon 969 (a water dispersible alkyd resin having air dry characteristics and sold by Ashland Chemical Company) 22.8 parts of 28% ammonium hydroxide and 548.8 parts of water were mixed thoroughly to give a 30% solution of Arolon 969. The solubilized resin solution (122.8 parts) was ground in a pebble mill for 24 hours at room temperature with 65.6 parts of molybdate orange and 12.3 parts of water. The grind was let down with 494.07 parts of Arolon 969 (30% solution), 27.82 parts of n-butanol (flow agent), 0.56 parts manganese naphthenate and 0.55 parts cobalt naphthenate (driers) and 91.71 parts water. 30 parts of the paint so formed was added to a mixture of 20 parts of 1,1,1-trichloroethane and 10 parts xylene and mixed thoroughly before being added to an aerosol container. Thereafter, the mixture was shaken and 40 parts of dichlorodifluoromethane was added under pressure to extend the emulsion. The mixture was again shaken and sprayed through an aerosol valve onto a substrate producing a very satisfactory orange coating.

A flammability test was performed with the composition of this example by spraying the composition across a lighted 1 inch diameter candle. No flame extension was observed. Thus, the formulation produced by this example was considered essentially non-flammable.

EXAMPLE 2

The following mixture was ground in a pebble mill for 24 hours at room temperature: 170 parts titanium dioxide; 102 parts of Arolon 363 (a water soluble oxidizing resin amine salt having air dry characteristics and sold by Ashland Chemical Company); 3 parts of Nopco NDW (a commercial defoamer sold by Diamond Shamrock Co. and added to prevent foaming during the grinding operation); 70 parts of water and 3 parts of triethylamine. The grind was let down with 324 parts Arolon 363, 0.5 parts lead naphthenate and 1.5 parts cobalt naphthenate (driers), 307 parts water and 2 parts triethylamine. 30 parts of the paint so formed was added to a mixture of 20 parts of 1,1,1-trichloroethane and 10 parts xylene and mixed thoroughly before being added to an aerosol container. Thereafter, the mixture was shaken and 40 parts of dichlorodifluoromethane was added under pressure to extend the emulsion. The mixture was again shaken and sprayed through an aerosol valve onto a polished metal plate. The paint sprayed and dried very well and exhibited excellent adhesion characteristics.

EXAMPLE 3

The procedure of Example 2 was repeated with the exception that the Arolon 363 was replaced with Arolon 376 (a water dispersible oxidizing alkyd resin amine salt sold by Ashland Chemical Company). The results were essentially the same, i.e., the sprayed paint gave excellent coating and was essentially non-flammable.

EXAMPLE 4

A mixture of 267 parts of Chempol 10-0066 (a water reducible oxidizing alkyd resin sold by Freeman Chemical Company), 112.5 parts isopropanol, 22.9 parts 28% ammonium hydroxide and 281 parts water was mixed until homogenous. 125 parts of the thus solubilized Chempol 10-0066, 1 part Nopco NDW, 65 parts molybdate orange, 6 parts 2-ethylhexanol (flow agent) and 5 parts cobalt naphthenate and 10 parts manganese naphthenate (driers) was ground in a pebble mill for 24 hours at room temperature. The grind was let down with 671 parts solubilized Chempol 10-0066 and the paint was formulated into an aerosol composition in the manner described in Example 1. The aerosol enamel sprayed and dried very well and exhibited excellent adhesion to metal surfaces.

EXAMPLE 5

Chempol 10-0066 was solubilized as described in Example 4. 121 parts of the solubilized resin was admixed with 1 part Nopco NDW, 6.5 parts of 2-ethylhexanol and 194 parts of rutile titanium dioxide. The mixture was ground in a pebble mill for 24 hours and thereafter redispersed for 1 hour with an additional 121 parts of solubilized Chempol 10-0066. The grind was let down with 375 parts of solubilized Chempol 10-0066, 10.6 parts of manganese naphthenate and 10.6 parts of cobalt naphthenate (driers). An aerosol formulation was produced in the manner described in Example 1.

EXAMPLE 6

The procedure of Example 5 was repeated with the exception that 19.4 parts of Carbon Black was substituted for the titanium dioxide.

EXAMPLE 7

The following mixture was ground in a pebble mill for 24 hours at room temperature: 170 parts of titanium dioxide; 102 parts Arolon 376; 3 parts Nopco NDW; 70 parts water and 2 parts triethylamine. The mixture was redispersed for an additional 1 hour by admixture with 100 parts of Arolon 376. The grind was then let down with 224 parts Arolon 376, 0.5 parts lead naphthenate and 1.8 parts cobalt naphthenate (driers), 308 parts water and 2 parts triethylamine. An aerosol paint formulation was produced in the manner described in Example 1.

Various aerosol formulations were produced with the air drying enamels as produced in several of the illustrated examples given above. The composition and results are illustrated in the following tables.

TABLE I

AEROSOL FORMULATIONS USING CHEMPOL 10-0066 WHITE (EXAMPLE 5)

| Compositions | 1 | 2 | 3 | 4 | 5 | 6 |
|---|---|---|---|---|---|---|
| Xylene | 30 | 15 | 15 | 15 | 15 | 15 |
| 1,1,1-trichloroethane |  | 15 |  |  |  |  |
| 1,1,2-trichloroethane |  |  | 15 |  |  |  |
| 1,1,2-trichloroethene |  |  |  | 15 |  |  |
| Perchloroethylene |  |  |  |  | 15 |  |
| Methylene Chloride |  |  |  |  |  | 15 |
| Chempol White | 30 | 30 | 30 | 30 | 30 | 30 |
| Dichlorodifluoromethane | 40 | 40 | 40 | 40 | 40 | 40 |

All systems emulsified on shaking and sprayed and dried very well. All had high gloss finishes.

TABLE II

AEROSOL FORMULATIONS USING CHEMPOL 10-0066 (EXAMPLE 6)

| Compositions | 1 | 2 | 3 | 4 | 5 | 6 |
|---|---|---|---|---|---|---|
| Xylene | 30 | 15 | 15 | 15 | 15 | 15 |
| 1,1,1-trichloroethane |  | 15 |  |  |  |  |
| 1,1,2-trichloroethane |  |  | 15 |  |  |  |
| 1,1,2-trichloroethene |  |  |  | 15 |  |  |
| Perchloroethylene |  |  |  |  | 15 |  |
| Methylene Chloride |  |  |  |  |  | 15 |
| Chempol Black | 30 | 30 | 30 | 30 | 30 | 30 |
| Dichlorodifluoromethane | 40 | 40 | 40 | 40 | 40 | 40 |

All systems emulsified on shaking. All formulations sprayed and dried to a high gloss finish.

TABLE III

AEROSOL FORMULATIONS USING AROLON 376 WHITE (EXAMPLE 7)

| Compositions | 1 | 2 | 3 | 4 | 5 |
|---|---|---|---|---|---|
| Xylene | 30 | 15 | 15 | 15 | 15 |
| Methylene Chloride |  |  | 5 |  | 5 |
| 1,1,2-trichloroethene |  | 15 | 10 |  |  |
| 1,1,1-trichloroethane |  |  |  | 15 | 10 |
| Arolon 376 White | 30 | 30 | 30 | 30 | 30 |
| Dichlorodifluoromethane | 40 | 40 | 40 | 40 | 40 |

All samples dispersed very well
No. 1 Ran very badly when sprayed onto metal.
Samples 2-5 all sprayed and dried to a high gloss finish.

TABLE IV

AEROSOL FORMULATIONS WITH DIFFERENT SOLVENT RATIOS

| Composition | 1 | 2 | 3 | 4 | 5 | 6 | 7 |
|---|---|---|---|---|---|---|---|
| Xylene | 15 | 10 | 5 | 0 | 15 | 10 | 5 |
| 1,1,2-trichloroethene | 15 | 20 | 25 | 30 | 15 | 20 | 25 |
| Chempol Black (Example 6) | 30 | 30 | 30 | 30 | — | — | — |
| Arolon 376 White (Example 7) |  |  |  |  | 30 | 30 | 30 |
| Dichlorodifluoromethane | 40 | 40 | 40 | 40 | 40 | 40 | 40 |

No. 1 Sprayed and dried satisfactory — high gloss
No. 2 Sprayed with some bubbles — still had gloss
No. 3 Sprayed with more bubbles — dried flat
No. 4 Sprayed with bubbles — dried flat
No. 5 Sprayed and dried satisfactorily — high gloss
No. 6 Sprayed and dried well — somewhat lower gloss
No. 7 Sprayed and dried fair — still lower gloss

I claim:

1. An aerosol sprayable air drying enamel paint composition comprising a dispersion of a pigment-containing aqueous solution of an amine salt of an alkyd or polyester resin having a molecular weight below about 10,000, in a liquid medium comprising (a) a mixture of 30–50 percent by weight of an aromatic hydrocarbon and 50–70 percent by weight of an halogenated hydrocarbon, said mixture having a boiling point between about 70° – 150°C, and (b) a liquified normally gaseous halogenated hydrocarbon propellant having 1–4 carbon atoms and a boiling point below about 25°C.

2. The paint composition as defined in claim 1 wherein the resin is an alkyd resin.

3. The paint composition as defined in claim 1 wherein component (a) is a mixture of 30–50 percent by weight of xylene and 50–70 percent by weight of a halogenated hydrocarbon.

4. The paint composition as defined in claim 3 wherein the halogenated hydrocarbon is a chlorinated hydrocarbon.

5. The paint composition as defined in claim 1 wherein component (b) is a fluorinated hydrocarbon.

6. An aerosol sprayable air drying enamel paint composition comprising a dispersion of pigment-containing aqueous solution of an amine salt of an alkyd resin having a molecular weight between 5,000–10,000, and a liquid medium comprising (a) a mixture of 30–50 percent by weight of xylene and 50–70 percent by weight of a chlorinated hydrocarbon, said mixture having a boiling point between about 80°–100°C, and (b) a liquified normally gaseous fluorinated hydrocarbon propellant having 1–4 carbon atoms and a boiling point below about 25°C.

7. An aerosol sprayable paint composition was defined in claim 6 wherein the chlorinated hydrocarbon of component (a) is 1,1,1-trichloroethane.

8. An aerosol sprayable paint composition as defined in claim 6 wherein the chlorinated hydrocarbon of component (a) is 1,1,2-trichloroethene.

9. The aerosol sprayable paint composition as defined in claim 7 wherein the fluorinated hydrocarbon propellant having a boiling point below 25°C is dichlorodifluoromethane.

* * * * *